(No Model.)
M. L. SUGGS.
NUT LOCK.
No. 565,942.  Patented Aug. 18, 1896.
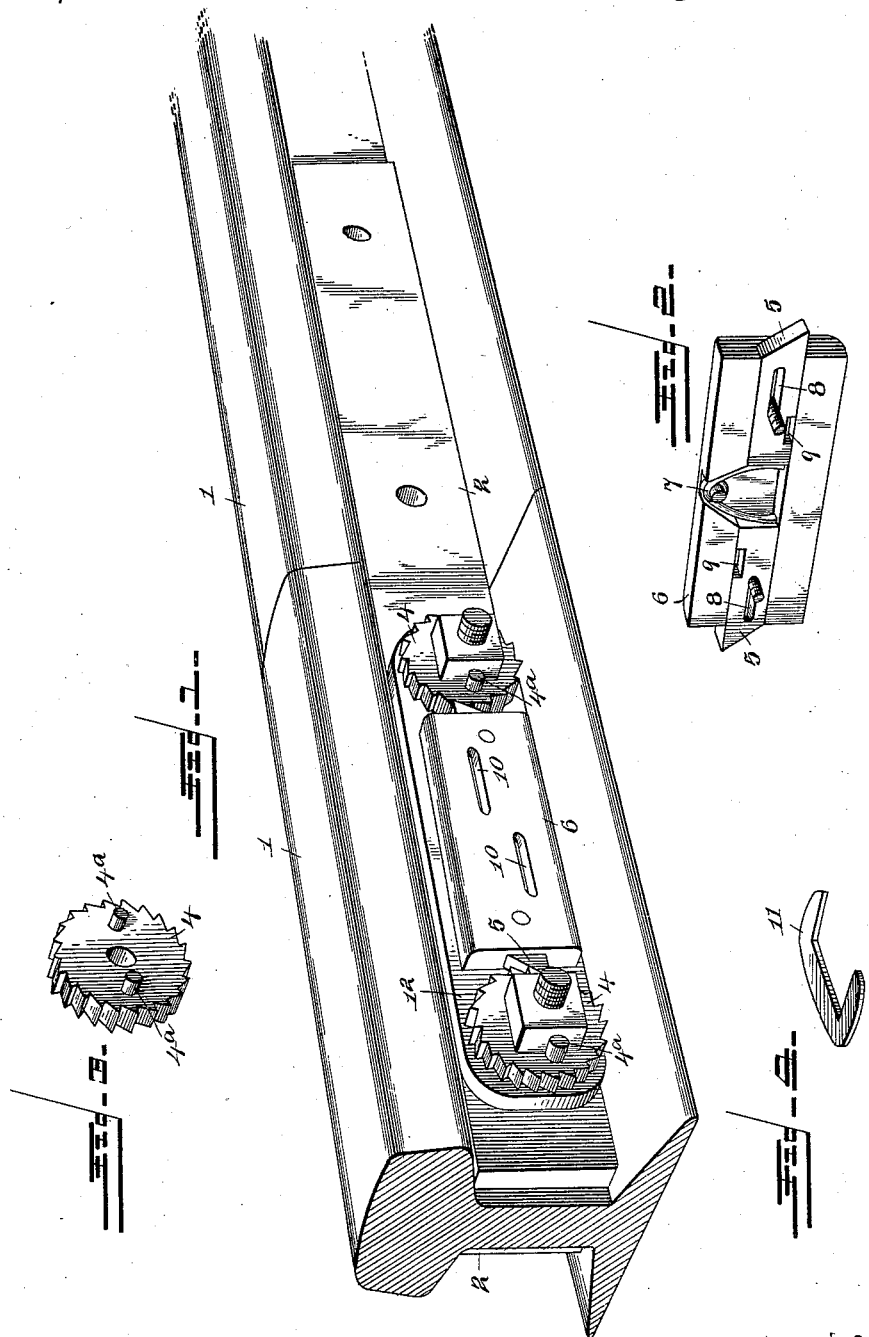
Witnesses
Thos. W. Riley
H. F. Riley
Inventor
Martin L. Suggs.
By his Attorneys,
C. A. Snow & Co.

UNITED STATES PATENT OFFICE.

MARTIN LEANDER SUGGS, OF LOWELL, NORTH CAROLINA.

NUT-LOCK.

SPECIFICATION forming part of Letters Patent No. 565,942, dated August 18, 1896.

Application filed November 21, 1895. Serial No. 569,668. (No model.)

*To all whom it may concern:*

Be it known that I, MARTIN LEANDER SUGGS, a citizen of the United States, residing at Lowell, in the county of Gaston and State of North Carolina, have invented a new and useful Nut-Lock, of which the following is a specification.

The invention relates to improvements in nut-locks.

The object of the present invention is to improve the construction of nut-locks and to provide a simple, inexpensive, and efficient one adapted to be readily applied to rail-joints and capable of locking the nuts of a pair of adjacent bolts to prevent them from accidentally unscrewing and adapted to release the nuts when it is desired to remove the bolts.

A further object of the invention is to provide a nut-lock which may be readily applied to bolts without necessitating any change either in the construction of the bolt or the nut.

The invention consists in the construction and novel combination and arrangement of parts hereinafter fully described, illustrated in the accompanying drawings, and pointed out in the claims hereto appended.

In the drawings, Figure 1 is a perspective view of a nut-lock constructed in accordance with this invention. Fig. 2 is a detail view illustrating the construction of the spring-actuated bolts and the manner of mounting the same. Fig. 3 is a detail perspective view of one of the ratchet-washers. Fig. 4 is a detail view of the key.

Like numerals of reference designate corresponding parts in all the figures of the drawings.

1 1 designate a pair of rails connected at their adjacent ends by fish-plates 2 and bolts 3 of the ordinary construction. The bolts have mounted on them ratchet washers or disks 4, provided with lugs or projections 4ª, located at opposite sides of the nuts and engaging the outer faces of the same, whereby the ratchet disks or washers are secured to the nuts and are adapted to prevent the nuts from rotating independently of them without altering the construction of the nuts.

The nuts are locked in pairs by oppositely-disposed spring-actuated bolts 5, mounted in a casing 6 and having beveled engaging ends interlocking with the teeth of the ratchet disks or washers. The bolts are located at opposite ends of the casing and are thrown outward into engagement with the ratchet disks or washers by a substantially U-shaped spring 7, provided intermediate of its ends with a coil and having its sides bearing against the inner ends of the bolts and interposed between them, and the coil of the spring also forms an eye for the reception of a fastening device, which retains the spring in proper position. The casing 6 consists of a plate grooved or recessed at its inner face for the reception of the bolts and spring. The bolts have their bevels reversely arranged in order to engage the ratchet disks or washers properly. They are provided intermediate of their ends with longitudinal slots 8, receiving fastening devices, whereby the reciprocation of the bolts is limited, and the bolts are also provided with openings or recesses 9, which correspond with slots or openings 10 of the casing and are adapted to be engaged by a key 11 for locking the bolts in a retracted position to permit the nuts to be unscrewed freely.

The casing is detachably mounted on a back plate 12, and is interposed between a pair of nuts, and the back plate is provided at its ends with bolt-openings and connects a pair of bolts.

It will be seen that the nut-lock is exceedingly simple and inexpensive in construction, that it is capable of locking a pair of nuts against accidentally unscrewing, and that it is adapted to permit the nuts to be readily removed when desired.

It will also be apparent that the construction of the bolts and nuts is not changed, and that the nut-lock may be readily applied to any ordinary rail-joint or analogous construction.

Changes in the form, proportion, and minor details of construction may be resorted to without departing from the principle or sacrificing any advantages of the invention.

What I claim is—

1. The combination with a pair of bolts, and a pair of nuts, of ratchets connected with the nuts, a casing mounted between the bolts and provided with slots or openings, a pair of locking-bolts arranged in the casing, engaging the ratchet and provided with recesses 9 located adjacent to the slots or openings and adapted to receive a key, whereby the bolts are held out of engagement with the ratchets, and a spring mounted on the casing, interposed between the locking-bolts and bearing against the inner ends of the same, substantially as described.

2. In a nut-lock, the combination with a pair of bolts having nuts, a pair of ratchet-washers loosely arranged on the bolt and provided with lugs or projections detachably engaging the nuts at the outer faces thereof, a casing mounted between the said bolts and provided with slots or openings, a pair of locking-bolts arranged in the casing, engaging the ratchet-teeth, and provided with recesses 9, located adjacent to the slots or openings and adapted to receive a key, whereby the bolts are held out of engagement with the washers and a spring mounted in the casing interposed between the bolts and bearing against the inner ends of the same, substantially as described.

In testimony that I claim the foregoing as my own I have hereto affixed my signature in the presence of two witnesses.

MARTIN LEANDER SUGGS.

Witnesses:
ANDY WIMBERLY,
JOHN WELLS.